United States Patent
Walia et al.

(10) Patent No.: US 10,572,516 B2
(45) Date of Patent: Feb. 25, 2020

(54) METHOD AND APPARATUS FOR MANAGING NATURAL LANGUAGE QUERIES OF CUSTOMERS

(71) Applicant: [24]7.AI, INC., San Jose, CA (US)

(72) Inventors: Anmol Walia, San Jose, CA (US); David J. Zuverink, Mountain View, CA (US)

(73) Assignee: [24]7.ai, Inc., San Jose, CA (US)

( * ) Notice: Subject to any disclaimer, the term of this patent is extended or adjusted under 35 U.S.C. 154(b) by 165 days.

(21) Appl. No.: 15/377,038

(22) Filed: Dec. 13, 2016

(65) Prior Publication Data

US 2017/0169101 A1    Jun. 15, 2017

Related U.S. Application Data

(60) Provisional application No. 62/267,561, filed on Dec. 15, 2015.

(51) Int. Cl.
| | | |
|---|---|---|
| G06F 17/30 | (2006.01) | |
| G06F 16/332 | (2019.01) | |
| G06F 16/33 | (2019.01) | |
| G06Q 30/00 | (2012.01) | |

(52) U.S. Cl.
CPC ...... *G06F 16/3329* (2019.01); *G06F 16/3344* (2019.01); *G06Q 30/016* (2013.01)

(58) Field of Classification Search
CPC ............ G06F 16/3329; G06F 16/3344; G06Q 30/016
See application file for complete search history.

(56) References Cited

U.S. PATENT DOCUMENTS

| | | | |
|---|---|---|---|
| 8,515,736 B1 * | 8/2013 | Duta | G10L 15/1822 704/9 |
| 8,667,072 B1 * | 3/2014 | Cordell | H04L 67/26 709/206 |
| 8,670,979 B2 | 3/2014 | Gruber et al. | |
| 9,058,362 B2 * | 6/2015 | Vijayaraghavan | G06F 17/30528 |
| 9,318,027 B2 * | 4/2016 | Byron | G09B 7/00 |

(Continued)

OTHER PUBLICATIONS

Burke, et al. "Question answering from Frequently-Asked Question Files: Experiences with the FAQ Finder System" Jun. 30, 1997, retrieved from http://citeseer.ist.psu.edu/burke97question.html.

(Continued)

*Primary Examiner* — Alicia M Willoughby
(74) *Attorney, Agent, or Firm* — Perkins Coie LLP; Michael A. Glenn

(57) ABSTRACT

A computer-implemented method and an apparatus manage natural language queries of customers. A natural language query provided by a customer on an enterprise interaction channel is received. The natural language query is analyzed to determine if an answer to the natural language query exists in at least one question-answer (QA) domain from among a plurality of QA domains by analyzing each QA domain from among the plurality of QA domains using a multi-level framework of natural language models. An answer to the natural language query is provided to the customer on the enterprise interaction channel if such an answer in available in the plurality of QA domains. If an answer is not available, then an appropriate response is provided to the customer to assist the customer.

25 Claims, 8 Drawing Sheets

(56) References Cited

U.S. PATENT DOCUMENTS

| | | | |
|---|---|---|---|
| 9,396,263 B1* | 7/2016 | Unger | G06F 17/30864 |
| 2001/0047270 A1* | 11/2001 | Gusick | G06Q 30/016 |
| | | | 705/1.1 |
| 2003/0004838 A1* | 1/2003 | Kusuda | G06F 17/30864 |
| | | | 705/26.41 |
| 2006/0101005 A1* | 5/2006 | Yang | G06F 17/3087 |
| 2008/0195378 A1* | 8/2008 | Nakazawa | G06F 17/30654 |
| | | | 704/9 |
| 2009/0089044 A1* | 4/2009 | Cooper | G06F 17/275 |
| | | | 704/9 |
| 2013/0080145 A1 | 3/2013 | Yamasaki et al. | |
| 2013/0297625 A1* | 11/2013 | Bierner | G06F 17/30864 |
| | | | 707/754 |
| 2013/0301820 A1* | 11/2013 | Williams | H04M 3/42195 |
| | | | 379/201.01 |
| 2013/0311166 A1 | 11/2013 | Yanpolsky et al. | |
| 2014/0104370 A1* | 4/2014 | Calman | G06Q 30/00 |
| | | | 348/14.08 |
| 2014/0129584 A1* | 5/2014 | Maple | G06F 17/30864 |
| | | | 707/760 |
| 2014/0250145 A1* | 9/2014 | Jones | G06Q 10/101 |
| | | | 707/769 |
| 2014/0304600 A1* | 10/2014 | Chu | G06F 17/30247 |
| | | | 715/716 |
| 2014/0358889 A1* | 12/2014 | Shmiel | G06F 17/2745 |
| | | | 707/710 |
| 2015/0006143 A1* | 1/2015 | Skiba | G06F 17/271 |
| | | | 704/2 |
| 2015/0019541 A1* | 1/2015 | Carus | G06F 17/3053 |
| | | | 707/723 |
| 2015/0066479 A1 | 3/2015 | Pasupalak et al. | |
| 2015/0088998 A1* | 3/2015 | Isensee | H04L 51/02 |
| | | | 709/206 |
| 2015/0161230 A1* | 6/2015 | Alkov | G06F 17/30705 |
| | | | 707/737 |
| 2016/0275582 A1 | 9/2016 | Zuverink et al. | |
| 2016/0283851 A1* | 9/2016 | Bufe | G06F 17/2775 |

OTHER PUBLICATIONS

Wavelength, et al. "Question answering" Wikipedia, the free encyclopedia, Aug. 2, 2010, retrieved from https://en.wkipedia.org/w/index.php?title=Question_answering&oldid=376811829.

* cited by examiner

METHOD AND APPARATUS FOR MANAGING NATURAL LANGUAGE QUERIES OF CUSTOMERS

CROSS REFERENCE TO RELATED APPLICATIONS

This application claims priority to U.S. provisional patent application Ser. No. 62/267,561, filed Dec. 15, 2015, which is incorporated herein in its entirety by this reference thereto.

TECHNICAL FIELD

The present technology generally relates to interactions between customers and customer support representatives of an enterprise, and more particularly to a method and apparatus for managing natural language queries of customers.

BACKGROUND

Enterprises and their customers interact with each other for a variety of purposes. For example, enterprises may engage with existing customers and potential customers to draw the customer's attention towards a product or a service, to provide information about an event of customer interest, to offer incentives and discounts, to solicit feedback, to provide billing related information, and the like. Similarly, the customers may initiate interactions with the enterprises to enquire about products/services of interest, to resolve concerns, to make payments, to lodge complaints, and the like.

Typically, a customer may wish to interact with an enterprise using a natural language form of communication. Communicating in such a manner enables the customer to express intent easily via voice, chat, email, etc. to obtain the desired outcomes. To support the customer's desire for natural language form of communication, many enterprises provide automated systems, such as for example automatic speech recognition (ASR) and interactive voice response (IVR) based interaction systems, chat assistants, and the like.

Typically, customers ask many types of questions such as for example, "What is my credit card balance?", "Can I get a limit increase on my card?", "How do I apply for a loan?", "My card is lost! What do I do?", and the like. To answer these and other sorts of questions, enterprises set up databases of questions and corresponding answers. The databases become large and complex as the range of products and services offered by the enterprises increases. The result is a commensurate increase in the range and number of possible questions and appropriate answers. To find an answer to a customer's question, an enterprise processes the question and then searches through the database for an appropriate answer. Depending on the question, there may be more than one appropriate answer to the question. For example, a customer may call in and ask, "What is my balance?" In an example scenario, the answer to such a simple question may be less obvious when the customer is calling a bank where the customer has multiple accounts. In some example scenarios, a customer may address the question to a wrong section of the enterprise. For example, a customer may call an enterprise to request a credit card limit increase but calls the lost or stolen card line instead. In such a scenario, a customer's interaction may be transferred and the customer may have to endure a long waiting period to initiate interaction with an agent. In some scenarios, the customer may not get the required assistance and exit the interaction with the enterprise. Such negative results are deleterious to enterprise objectives.

Therefore there is a need to determine what a customer query is efficiently and cost effectively, whether one or more answers to the query are available, and then offer an appropriate answer to the customer. When an appropriate answer is not available, it is desirable that contingency plans and processes are in place, which retain the customers long enough to answer their questions, but not so long that the enterprises incur excessive cost or lose other customers because of long wait times.

SUMMARY

In an embodiment of the invention, a computer-implemented method for managing natural language queries of customers is disclosed. The method receives, by a processor, a natural language query provided by a customer on an enterprise interaction channel. The method determines, by the processor, if a question-answer (QA) domain is relevant to the natural language query. The relevancy of the QA domain is determined from among a plurality of QA domains by analyzing each QA domain from among the plurality of QA domains using a top-level natural language model associated with a multi-level framework of natural language models. Each QA domain is associated with one or more sub-domains. Each sub-domain from among the one or more sub-domains is associated with at least one respective lower-level natural language model. For the QA domain determined to be relevant to the natural language query, the method identifies, by the processor, at least one sub-domain including one or more questions substantially similar to the natural language query. The sub-domain is identified by analyzing questions associated with the each sub-domain of the QA domain in relation to the natural language query. The questions are analyzed using the respective lower-level natural language model. The method determines, by the processor, if at least one question from among the one or more questions is associated with a query matching metric of greater than a predefined threshold value. The method effects, by the processor, a provisioning of a response to the customer on the enterprise interaction channel based on the determination of whether the at least one question from among the one or more questions is associated with the query matching metric of greater than the predefined threshold value.

In another embodiment of the invention, an apparatus for managing natural language queries of customers includes at least one processor and a memory. The memory stores machine executable instructions therein that, when executed by the at least one processor, cause the apparatus to receive a natural language query provided by a customer on an enterprise interaction channel. The apparatus determines if a question-answer (QA) domain is relevant to the natural language query. The relevancy of the QA domain is determined from among a plurality of QA domains by analyzing each QA domain from among the plurality of QA domains using a top-level natural language model associated with a multi-level framework of natural language models. Each QA domain is associated with one or more sub-domains. Each sub-domain from among the one or more sub-domains is associated with at least one respective lower-level natural language model. For the QA domain determined to be relevant to the natural language query, the apparatus identifies at least one sub-domain including one or more questions substantially similar to the natural language query. The sub-domain is identified by analyzing questions associated with the each sub-domain of the QA domain in relation to the natural language query. The questions are analyzed using the respective lower-level natural language model. The apparatus determines if at least one question from among the one or more questions is associated with a query matching metric of greater than a predefined threshold value. The apparatus effects a provisioning of a response to the customer on the enterprise interaction channel based on the determination of whether the at least one question from among the one or more questions is associated with the query matching metric of greater than the predefined threshold value.

In an embodiment of the invention, another computer-implemented method for managing natural language queries of customers is disclosed. The method causes, by a processor, display of a chat widget offering chat assistance on one or more webpages of an enterprise Website. In response to customer input corresponding to the chat widget on a webpage of the enterprise Website, the method causes display of a dialog screen, by the processor, on the webpage. The method receives, by the processor, a natural language query provided as an input by a customer in the dialog screen. The method determines, by the processor, if an answer to the natural language query exists in at least one question-answer (QA) domain from among a plurality of QA domains by analyzing each QA domain from among the plurality of QA domains using a multi-level framework of natural language models. The method effects, by the processor, a provisioning of a response to the customer in the dialog screen based on the determination of whether the answer to the natural language query exists in the at least one QA domain from among the plurality of QA domains.

DETAILED DESCRIPTION

Figure 1:
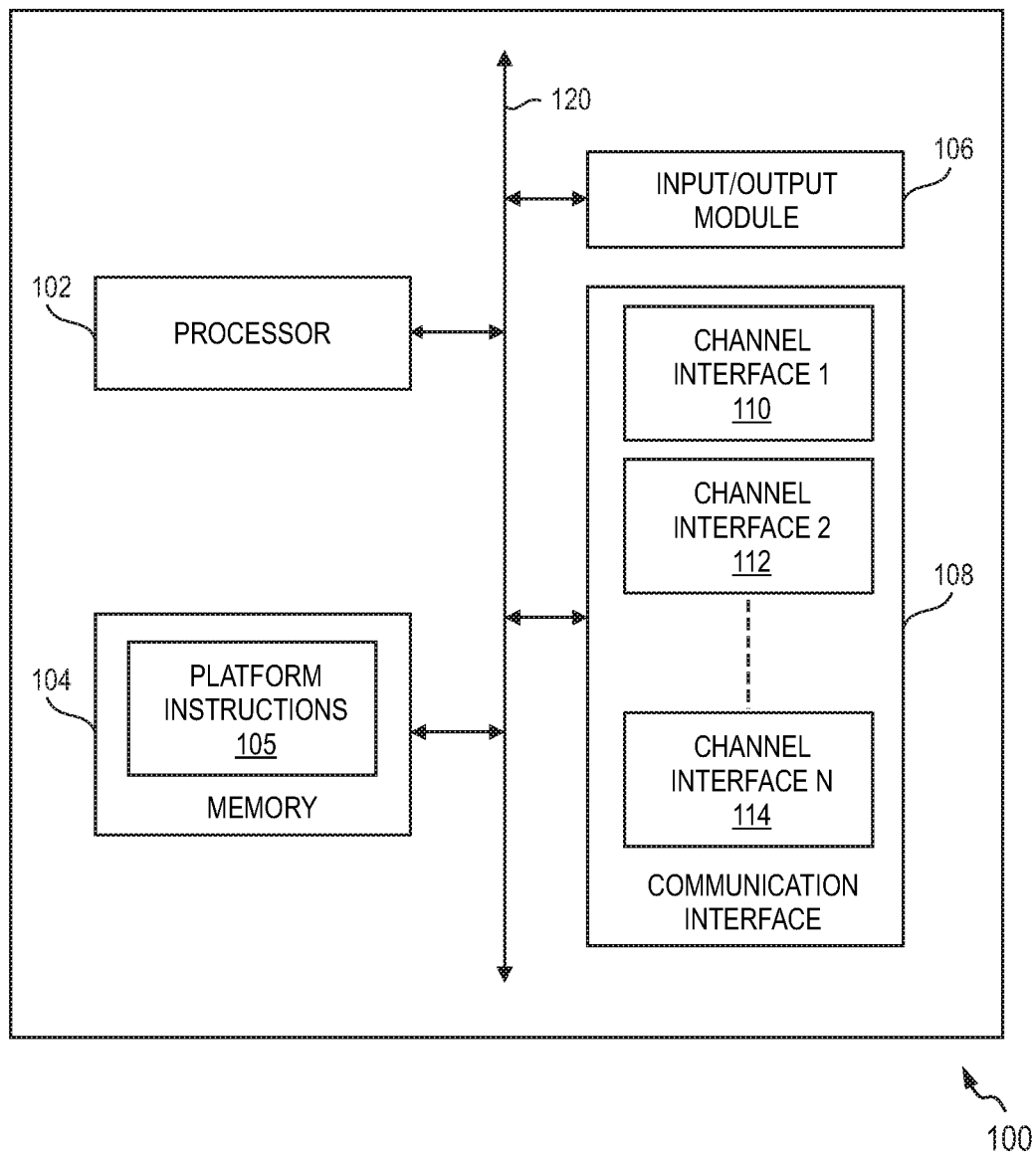
FIG. 1 shows a block diagram of an apparatus for managing natural language queries of customers in accordance with an embodiment of the invention.

The detailed description provided below in connection with the appended drawings is intended as a description of the present embodiments of the invention and is not intended to represent the only forms in which the invention may be constructed or used. However, the same or equivalent functions and sequences may be accomplished by different embodiments of the invention.

Typically, customers prefer the natural language form of communication when communicating with customer support representatives or agents of an enterprise. Customers may address various types of queries to the customer support representatives in natural language. To answer these and other sorts of questions, enterprises typically set up databases of questions and corresponding answers. The databases become large and complex as the range of products and services offered by the enterprises increases. The result is a commensurate increase in the range and number of possible questions and appropriate answers. To find an answer to a customer's question, an enterprise processes the question and then searches through the database for an appropriate answer. In many example scenarios, depending on the question, there may be more than one appropriate answer to the question. In some example scenarios, a customer may address the question to a wrong section of the enterprise. In such a scenario, a customer's interaction may be transferred and the customer may have to endure a long waiting period to initiate interaction with an agent. In some scenarios, the customer may not receive the required assistance and exit the interaction with the enterprise. Such negative results are deleterious to enterprise objectives.

Various embodiments of the invention provide methods and apparatuses that are capable of overcoming the above shortcomings and provide additional benefits. More specifically, various embodiments disclosed herein provide methods and apparatuses for managing natural language queries of customers. A customer's natural language queries are analyzed using a multi-level framework of natural language models to determine if corresponding answers to customer queries exist in question-answer (QA) databases or not. If one or more answers to the customer queries exist in the QA databases, then the answers may be provided to the customers. If it is determined that the answers to the natural language queries do not exist, then the customers may be offered interaction with a live agent or the customers may be asked follow-up questions to seek clarification on the natural language queries. In some embodiments, the customers may also be offered links to webpages including content that may be of interest to the customers. In some cases, where a customer declines the offer for agent interaction or does not respond to the follow-up question, a message indicative of the unavailability of answer may be provided to the customer.

Various aspects of the invention are explained hereinafter with reference to FIGS. 1 to 8.

FIG. 1 is a block diagram of an apparatus 100 configured to manage natural language queries of customers in accordance with an embodiment of the invention. The term 'customer' as used herein refers to either an existing user or a potential user of enterprise offerings such as products, services and/or information. Moreover, the term 'customer' of the enterprise may refer to an individual, a group of individuals, an organizational entity, etc. The term 'enterprise' as used herein may refer to a corporation, an institution, a small/medium sized company, or even a brick and mortar entity. For example, the enterprise may be a banking enterprise, an educational institution, a financial trading enterprise, an aviation company, a consumer goods enterprise, or any such public or private sector enterprise.

Generally, a customer may initiate an interaction with an enterprise with some purpose in mind. For example, the customer may put forth a query related to troubleshooting an issue with a recently purchased product to a customer support representative of an enterprise. In another illustrative example, a customer may chat with an agent to seek clarification on a product return policy. The term 'agent' as used herein may refer to a human agent or a virtual agent capable of assisting customers with their respective needs. Some examples of human agents may include voice agents, chat agents, and the like. Some examples of virtual agents may include a chatbot, an interactive voice response (IVR) system, smart virtual assistants, and the like.

The term 'managing natural language queries' as used herein refers to providing appropriate responses to natural language queries of the customers, such that the customers are satisfied with the responses and do not have to endure long waiting times to receive requested assistance. In cases, where no answers to customer's natural language queries are available, the customer is offered an interaction with live agents. In scenarios, where no answers are available for a customer query and the offer for interaction is not accepted by the customer, a message indicative of unavailability of the answers is provided to the customer without delay, thereby avoiding frustrating experiences for the customer.

The apparatus 100 includes at least one processor, such as a processor 102 and a memory 104. It is noted that although the apparatus 100 is depicted to include only one processor, the apparatus 100 may include two or more processors therein. In an embodiment, the memory 104 is capable of storing machine executable instructions, referred to herein as platform instructions 105. Further, the processor 102 is capable of executing the platform instructions 105. In an embodiment, the processor 102 may be embodied as a multi-core processor, a single core processor, or a combination of one or more multi-core processors and one or more single core processors. For example, the processor 102 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processor 102 may be configured to execute hard-coded functionality. In an embodiment, the processor 102 is embodied as an executor of software instructions, wherein the instructions may specifically configure the processor 102 to perform the algorithms and/or operations described herein when the instructions are executed.

The memory 104 may be embodied as one or more volatile memory devices, one or more non-volatile memory devices, and/or a combination of one or more volatile memory devices and non-volatile memory devices. For example, the memory 104 may be embodied as magnetic storage devices, such as hard disk drives, floppy disks, magnetic tapes, etc.; optical magnetic storage devices, e.g. magneto-optical disks; CD-ROM (compact disc read only memory); CD-R (compact disc recordable); CD-R/W (compact disc rewritable); DVD (Digital Versatile Disc); BD (BLU-RAY® Disc); and semiconductor memories, such as mask ROM, PROM (programmable ROM), EPROM (erasable PROM), flash memory, RAM (random access memory), etc.

In at least one example embodiment, the memory 104 stores a plurality of question-answer (QA) domains. It is noted that the term 'domains' and 'databases' are used interchangeably herein. Each QA domain, i.e. a QA database, includes a plurality of questions typically asked by customers for a particular category along with corresponding answers. The QA domains may be related to a product offering, a service offering, a type of concern, and the like. For example, a QA domain may be related to 'credit cards' offered by an enterprise. Such a QA domain may include typical questions asked by customers related to credit cards along with corresponding answers. In another illustrative example, a QA domain may be related to travel reservations. Such a QA domain may include typical questions asked by customers related to booking, cancelling, and rescheduling of travel reservations, along with corresponding answers. In another illustrative example, a QA domain may be related to 'billing.' Such a QA domain may include typical questions asked by customers related to billing concerns such, as for example, 'Why does my bill reflect last month's arrears?, 'How do I pay the bill using my e-wallet?, and the like, along with corresponding answers.

Each QA domain stored in the memory 104 is further associated with one or more sub-domains. Each sub-domain further comprises questions and corresponding answers that narrow the scope of questions to more specific types of questions. For example, a sub-domain of a QA domain related to 'credit cards' category may be related to 'Reward points' offered against billed transactions performed using the credit cards. Such a sub-domain may include typical questions asked by customers related to reward points such as, for example, questions like 'How do I redeem my reward points?, 'How do I exchange my rewards points against airline miles?, and the like. Each sub-domain may include questions related to the respective sub-category along with corresponding answers.

In at least one example embodiment, the memory 104 stores a multi-level framework of natural language models. In an illustrative example, the memory 104 stores a hierarchy of natural language models with a natural language model at a top level and several natural language models in each of several lower levels, thereby configuring a multi-level framework of natural language models. Each natural language model is configured to analyze a natural language query using a set of respective rules and to identify an intent category of the natural language query. The analysis of the natural language query using the multi-level framework of natural language models will be explained in detail later.

The apparatus 100 also includes an input/output module 106, hereinafter referred to as 'I/O module 106', and at least one communication interface such as the communication interface 108. The I/O module 106 is configured to facilitate provisioning of an output to a user of the apparatus 100. In an embodiment, the I/O module 106 may be configured to provide a user interface (UI) configured to provide options or any other display to the user. The I/O module 106 may also include mechanisms configured to receive inputs from the user of the apparatus 100. The I/O module 106 is configured to be in communication with the processor 102 and the memory 104. Examples of the I/O module 106 include, but are not limited to, an input interface and/or an output interface. Examples of the input interface may include, but are not limited to, a keyboard, a mouse, a joystick, a keypad, a touch screen, soft keys, a microphone, and the like. Examples of the output interface may include, but are not limited to, a display such as a light emitting diode display, a thin-film transistor (TFT) display, a liquid crystal display, an active-matrix organic light-emitting diode (AMOLED) display, a microphone, a speaker, a ringer, a vibrator, and the like. In an example embodiment, the processor 102 may include I/O circuitry configured to control at least some functions of one or more elements of the I/O module 106 such as, for example, a speaker, a microphone, a display, and/or the like. The processor 102 and/or the I/O circuitry may be configured to control one or more functions of the one or more elements of the I/O module 106 through computer program instructions, for example, software and/or firmware stored on a memory, for example, the memory 104, and/or the like, accessible to the processor 102.

The communication interface 108 is depicted to include several channel interfaces to communicate with a plurality of enterprise related interaction channels. As an illustrative example, the communication interface 108 is depicted to include channel interfaces 110, 112 to 114 (depicted as 'Channel interface 1', 'Channel interface 2' to 'Channel interface N' in FIG. 1, respectively) to communicate with the plurality of enterprise related interaction channels. Some non-limiting examples of the enterprise related interaction channels include a Web channel, i.e. an enterprise Website, a voice channel, i.e. voice-based customer support, a chat channel, i.e. a chat support, a native mobile application channel, a social media channel, and the like. Each channel interface may be associated with a respective communication circuitry such as, for example, a transceiver circuitry including antenna and other communication media interfaces to connect to a wired and/or wireless communication network. The communication circuitry associated with each channel interface may, in at least some example embodiments, enable transmission of data signals and/or reception of signals from remote network entities, such as Web servers hosting enterprise website or a server at a customer support or service center configured to maintain real-time information related to interactions between customers and agents. For example, the communication interface 108 is configured to receive communication provided by customers on enterprise interaction channels in substantially real-time, i.e. with minimal delay, such a delay of the order of few milliseconds.

In some embodiments, the communication interface 108 may also be configured to receive information from the plurality of devices used by the customers. To that effect, the communication interface 108 may be in operative communication with various customer touch points, such as electronic devices associated with the customers, Websites visited by the customers, devices used by customer support representatives, for example voice agents, chat agents, IVR systems, in-store agents, and the like, engaged by the customers, and the like. In at least some embodiments, the communication interface 108 may include relevant application programming interfaces (APIs) configured to facilitate reception of information related to customer communication from the customer touch points.

In an embodiment, various components of the apparatus 100, such as the processor 102, the memory 104, the I/O module 106 and the communication interface 108 are configured to communicate with each other via or through a centralized circuit system 120. The centralized circuit system 120 may be various devices configured to, among other things, provide or enable communication between the components (102-108) of the apparatus 100. In certain embodiments, the centralized circuit system 120 may be a central printed circuit board (PCB) such as a motherboard, a main board, a system board, or a logic board. The centralized circuit system 120 may also, or alternatively, include other printed circuit assemblies (PCAs) or communication channel media.

It is noted that the apparatus 100 as illustrated and hereinafter described is merely illustrative of an apparatus that could benefit from embodiments of the invention and, therefore, should not be taken to limit the scope of the invention. It is noted that the apparatus 100 may include fewer or more components than those depicted in FIG. 1. In an embodiment, the apparatus 100 may be implemented as a platform including a mix of existing open systems, proprietary systems and third party systems. In another embodiment, the apparatus 100 may be implemented completely as a platform including a set of software layers on top of existing hardware systems. In an embodiment, one or more components of the apparatus 100 may be deployed in a Web server. In another embodiment, the apparatus 100 may be a standalone component in a remote machine connected to a communication network and capable of executing a set of instructions (sequential and/or otherwise) so as to manage natural language queries of customers. Moreover, the apparatus 100 may be implemented as a centralized system, or, alternatively, the various components of the apparatus 100 may be deployed in a distributed manner while being operatively coupled to each other. In an embodiment, one or more functionalities of the apparatus 100 may also be embodied as a client within devices, such as customers' devices. An example of such a client may be a smart virtual assistant. In another embodiment, the apparatus 100 may be a central system that is shared by or accessible to each of such devices.

The managing of natural language queries of customers by the apparatus 100 is hereinafter explained with reference to a single natural language query of a customer of an enterprise. It is noted the apparatus 100 may be caused to manage natural language queries from several customers of various enterprises in a similar manner.

In at least one example embodiment, the processor 102 is configured to, with the content of the memory 104, cause the apparatus 100 to receive a natural language query provided by a customer on an enterprise interaction channel. More specifically, the communication interface 108 of the apparatus 100 may receive natural language communication provided by the customer on an enterprise related interaction channels. The term 'natural language query' as used herein refers to a query or a question posed in a natural language form as part of communication between two individual entities. For example, a customer may ask, "What is the due date for my landline bill?" In another illustrative example, a customer may verbally complain "The delivery of my shipment has been delayed by two days now. This is unacceptable!!" to an agent. Such form of communication, whether in verbal or textual form, may be termed herein as natural language form of communication. It is noted that such form of communication is different from other forms of customer-enterprise communication, such as those involving selection of menu options during an IVR based interaction or choosing buttons in online Web forms or questionnaires, to seek assistance.

The natural language query posed by the customer may be in a voice, text, a chat, or other form. Moreover, the natural language query may be received from any of various interaction channels, such as a Web channel, a native application channel, a chat channel, a voice channel, etc. and from any of various personal devices of the customer, such as for example, a mobile phone, a smartphone, a laptop, a tablet computer, a personal computer, a wearable communication device, and the like.

In at least one example embodiment, if the natural language query is in speech form, the apparatus 100 is caused to convert the speech form to a text form. To that effect, the processor 102 may be configured to check if the received natural language query is in speech form or in text form. In at least one example embodiment, the processor 102 may fetch machine instructions (or software programs) stored in the memory 104 for automatic speech recognition (ASR) and statistical learning models (SLM) to perform speech-to-text conversion and thereby convert the natural language query from a speech form to a text form.

As explained above, the memory 104 is configured to store a plurality of answers to a range of natural language queries that customers may ask an enterprise during their interactions. For example, a customer may interact with an enterprise to enquire about products/services of interest, to resolve concerns, to make payments, to lodge complaints, etc. Accordingly all possible questions related to such interactions may be stored with corresponding answers in the memory 104.

In at least one example embodiment, the processor 102 is configured to, with the content of the memory 104, cause the apparatus 100 to determine if a question-answer (QA) domain is relevant to the natural language query. More specifically, the apparatus is caused to determine if a QA domain is likely to include answer to the natural language query or not. The relevancy of the QA domain is determined from among a plurality of QA domains by analyzing each QA domain from among the plurality of QA domains using a top-level natural language model associated with a multi-level framework of natural language models. More specifically, the top-level natural language model in the multi-level framework of natural language models is applied to a customer's natural language query to first determine the domain, i.e. a database, most likely to contain one or more appropriate answers to the customer's query.

In an illustrative example, the top-level natural language model may be configured to parse the natural language query to generate unigrams, bigrams and/or n-grams and apply rules comparing the generated n-grams with predefined list of words or phrases corresponding to respective categories to identify the QA domain most likely to contain one or more appropriate answers to the customer's query. For example, if the natural language query includes terms such as 'bill payment', 'card', etc, then the top-level natural language model may be configured to identify the QA domain 'Cards' as relevant to the natural language query.

For the QA domain identified to be relevant, in at least one example embodiment, the processor 102 is configured to, with the content of the memory 104, cause the apparatus 100 to identify at least one sub-domain that includes one or more questions substantially similar to the natural language query. As explained above, each QA domain is associated with one or more sub-domains. Further, each sub-domain is associated with at least one respective lower-level natural language model, i.e. a natural language model including specific rules to identify questions related to the sub-domain. The rules may be configured to compare n-grams generated from parsing the natural language query with predefined list of words or phrases corresponding to respective categories, as explained above. The apparatus 100 is caused to analyze questions in each sub-domain of the relevant QA domain using respective lower-level natural language model to identify a sub-domain, which includes questions substantially similar, i.e. with minimal difference in words used and implied meaning of words, to the natural language query. More specifically, using additional lower-level natural language models, the search is further refined within the relevant QA domain to determine whether one or more appropriate answers to the query can be found or not.

In at least one example embodiment, the processor 102 is configured to, with the content of the memory 104, cause the apparatus 100 to determine if at least one question from among the one or more questions is associated with a query matching metric of greater than a predefined threshold value. More specifically, if a particular sub-domain is identified to have several questions, which are similar to the natural language query, then the apparatus is caused to determine a level of a match between the natural language query and each question in the sub-domain identified to be similar to the natural language query. In the embodiment, the apparatus 100 may be caused to compute a query matching metric to determine the level of match between the natural language query and questions identified to be similar to the natural language query. In an illustrative example, the apparatus 200 may be caused to match individual words and a sequence of words to generate the query matching metric. For example, if the exact sequence of words matches between the natural language query and a question in the sub-domain, then the query matching metric may assume the value of one, i.e. 100% match. However, if most of the words of the natural language query are present in a question but some words are missing, then the query matching metric for the question may assume a value of 0.95, i.e. 95% match.

In at least one example embodiment, the apparatus 100 may further be caused to identify if any question in the sub-domain is associated with a query matching metric of greater than a predefined threshold value. In an illustrative example, the predefined threshold value may be set to 0.85, i.e. 85% match. Such a value of the predefined threshold may be set based on empirical observations of several research studies and also feedback received from customers regarding the relevancy of answers provided to the respective natural language queries. The predefined threshold value of 0.85 is mentioned herein for illustration purposes and is not intended to limit the scope of the invention. Indeed, the predefined threshold value may assume various other values, which may vary based on the QA domain. For example, the QA domain related to banking related questions, which may be worded in several ways may have lower predefined threshold values, whereas a QA domain related to flight cancellations, which may be worded in relatively fewer ways, may have a relatively higher predefined threshold value.

In at least one example embodiment, the processor 102 is configured to, with the content of the memory 104, cause the apparatus 100 to effect a provisioning of a response to the customer on the enterprise interaction channel based on the determination of whether at least one question is associated with the query matching metric of greater than the predefined threshold value. In an embodiment, the apparatus 100 is caused to effect provisioning of at least one answer as the response to the customer if at least one question is associated with the query matching metric of greater than the predefined threshold value. The at least one answer corresponds to the at least one question. The provisioning of an answer as a response is further explained below.

As explained above, questions within each sub-domain in a QA domain are analyzed using respective lower-level language natural language models to determine if a question with a query matching metric greater than a predefined threshold value is identified or not. If a question with the query matching metric of greater than the predefined threshold value is identified, then the answer of the corresponding question is provided to the customer as the response.

In an embodiment, the apparatus 100 may be caused to effect provisioning of a follow-up question if no question is associated with a query matching metric of greater than the predefined threshold value. The follow-up question is configured to seek clarification on the natural language query from the customer. In an illustrative example, the customer may ask two or more questions in a single natural language query. In such a scenario, the follow-up question may suggest to the customer to ask a single query, or ask the customer to confirm the question with a 'Did you mean this . . . ' statement.

In an embodiment, the apparatus 100 may be caused to receive a reply from the customer as a response to the follow-up question and repeat the steps of (1) determining a relevant QA domain from among the plurality of QA domains; (2) identifying a sub-domain from the relevant QA domain comprising one or more questions substantially similar to the natural language query; (3) determining if at least one question from among the one or more questions is associated with a matching metric of greater than the pre-defined threshold value; and (4) effecting a provisioning of a response to the customer. More specifically, the apparatus 100 is caused to repeat the analysis of the reply (or refined query) provided by the customer using the multi-level framework of natural language models to determine an appropriate response to be provided by the customer.

In an embodiment, the apparatus 100 is caused to effect provisioning of an offer for agent assistance as the response to the customer if no QA domain from among the plurality of QA domains is determined to be relevant to the natural language query. Further, the apparatus 100 is caused to facilitate an interaction with an agent subsequent to receiving an acceptance of the offer for agent assistance from the customer. As explained above, the agent may be an automated agent, a smart virtual assistant or a human agent. In an embodiment, the apparatus 100 may be caused to effect provisioning of a request to the customer to provide a rating for the agent subsequent to the customer's interaction with the agent. In one embodiment, the apparatus 100 may be caused to effect provisioning of a message indicative of an unavailability of an answer to the natural language query if an acceptance of the offer for agent assistance is not received from the customer.

Alternatively, in one embodiment, the apparatus 100 is caused to effect provisioning of a link to an enterprise webpage as the response to the customer if no QA domain from among the plurality of QA domains is determined to be relevant to the natural language query.

To summarize, if an appropriate answer to the natural language query is available in the QA domains, then the answer is provided to the customer. If the appropriate answer to the natural language query is not available in the QA domains, then the customer is offered options that can help lead to the appropriate answer. For example, as explained above, the options include a link to a webpage (homepage, FAQ, etc.), an offer to provide an additional query or refine the query, an offer to chat with an agent, and the like.

Such escalation of the handling of the customer request leads to a quick and efficient resolution of the customer query. Moreover, an effectiveness of the answer provided to the customer may be gauged by requesting feedback from the customer. The analysis of the natural language query using a multi-level framework of natural language model in the form of a hierarchical framework of natural language models is explained with reference to an illustrative example in FIG. 2.

Figure 2:
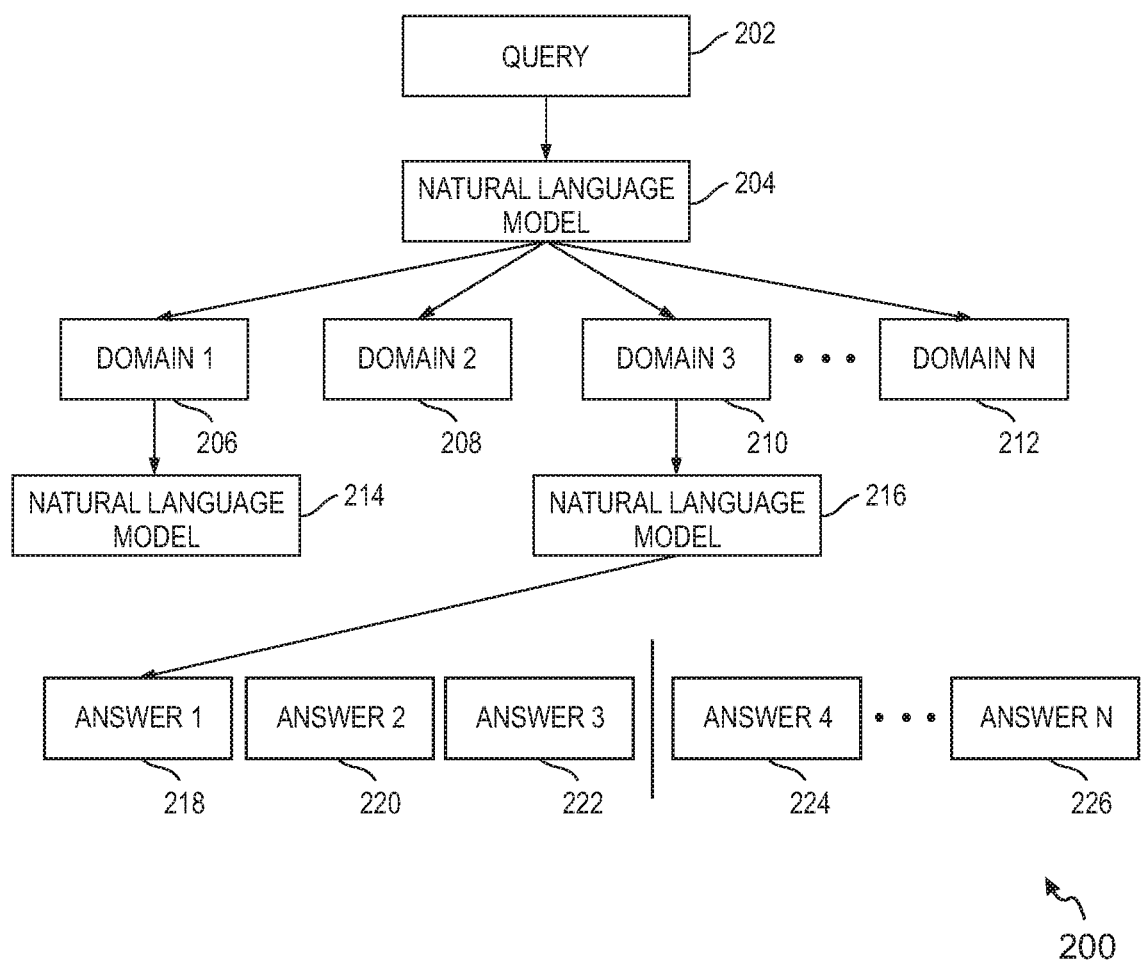
FIG. 2 shows an example block diagram for illustrating analysis of a natural language query based on a hierarchical framework of natural language models in accordance with an example embodiment of the invention.

Referring now to FIG. 2, an example block diagram 200 for illustrating analysis of a natural language query 202 based on a hierarchical framework of natural language models is shown in accordance with an embodiment of the invention. The natural language query 202 is referred to as 'query 202' hereinafter. In an illustrative example, a customer provides the query 202 in a natural language form. The query 202 may be provided through a widget, an application, a webpage, and the like. Further, the query 202 may be a question, a request for authorization, a request for chat, a request for assistance, and so on. In case the query 202 is a question then one or more answers to the query 202 may exist in a QA domain as explained with reference to FIG. 1. In some scenarios, however, the QA domains may not include answer to the query 202.

As explained with reference to FIG. 1, natural language queries, such as the query 202, are analyzed using a multi-level framework of natural language models such as, for example a hierarchical framework of natural language models. The hierarchical framework is configured to identify a QA domain (hereinafter referred to as 'domain') in which one or more appropriate answers to the query 202 are likely to be found by applying several natural language models to the query 202. For example, the query 202 is initially analyzed using a top-level natural language model to identify a domain most likely to contain appropriate answers to the query 202. Once the relevant domain is identified, the apparatus 100 may use the results of the analysis by the top-level natural language model to perform various tasks, such as classifying the customer query into broad intents. A search for appropriate question-answer pairs may then be performed within the domain best suited to (or matched to) the query. The search results may be ranked based on query matching metrics. Different threshold values can be used for the top-level natural language model and each sub-model. When the query matching metric for the query searches are above a predefined threshold value, then the apparatus 100 may further refine the search for an answer to the query. When the query matching metrics are below the threshold, thereby indicating low confidence level in match between questions of a domain and the natural language query, then the apparatus 100 may offer multiple answers to the customer and then allow the customer to choose, which answer the customer likes best, e.g. by providing a second query. The customer response may be used to narrow intent/domain search.

Accordingly, in FIG. 2, the query 202 is depicted to be initially analyzed using a top-level natural language model, such as a natural language model 204. The natural language model 204 is used to determine whether one or more domains such as domain 1, domain 2, domain 3, and domain N (hereinafter referred to as domains 206, 208, 210 and 212, respectively) include appropriate answers to the query 202. A second set of lower-level natural language models, such as natural language models 214 and 216, may thereafter be used to further analyze the query 202. In an illustrative example, the domain 210 includes at least one appropriate answer to the query 202. The natural language model 216 may then be used to identify the at least one appropriate answer to the query 202. In an example scenario, multiple answers may be identified as appropriate responses to the query. For example, answer 1, answer 2, answer 3, answer 4, and answer N (hereinafter referred to as answers 218, 220, 222, 224 and 226, respectively) may be identified as appropriate answers to the query 202, based on the query matching metric of respective questions of these answers being greater than the predefined threshold value. The identified answers may be categorized based on appropriateness, by domain, and so on, and one or more appropriate answers from among the identified answers may be provisioned to the customer.

In an illustrative example, a top-level natural language model is configured to identify whether the query 202 is a request for assistance, a request for authorization, a request for a specific task, etc. Upon determining an appropriate domain, the query 202 may further be analyzed using further sets of lower-level natural language models to identify the appropriate answer. In an illustrative example, the query 202 from a customer of a banking enterprise may be identified to be a request for assistance by the apparatus 100 using the top-level natural language model. Thereafter, the query 202 may be analyzed using a first set of lower-level natural language models, which may be configured to identify if the query 202 relates to any of the domains 'Accounts', 'Loans and Disbursal', 'Cards', 'Remittances', and the like. Upon determining that the query 202 relates to the domain 'Cards', a next set of natural language models may be configured to determine whether the query 202 relates to any of a 'Debit Card', 'Credit Card', 'Corporate Card', or 'Loyalty Card' sub-domains within the domain 'Cards.'

In an example scenario, the apparatus 100 may determine that the query 202 relates to the 'Credit Card' sub-domain. The apparatus 100 may further analyze the query 202 to identify a match between the textual content in the query 202 and a plurality of questions stored in the sub-domain such as, for example, 'Card not working', 'fraudulent transaction on my credit card', 'redeem my points on the credit card', etc. to identify one or more appropriate answers to the query 202. Each domain/sub-domain is associated with at least one natural language model to facilitate match of natural language queries of customers to questions stored in the domain/sub-domain and further identify appropriate answers to the natural language queries.

As explained with reference to FIG. 1, the apparatus 100 may be configured to perform other actions based on the results of searching for appropriate answers to the query 202. For example, an answer to the query 202 can be presented to the customer and the customer can then be asked whether the answer was useful or not. If the answer was useful and the customer is satisfied then the interaction between the customer and the enterprise may be completed. If the answer is not useful, then the customer may be referred to a webpage such as homepage, an FAQ page, etc. Alternatively, the customer can be asked an additional question to help refine the search. The additional question can be to select the best answer form a list of proposed answers. The additional response from the customer can then be used to further refine the search to locate an appropriate answer to the customer query.

In some embodiments, the apparatus 100 may be configured to offer to the customer a chat session with an agent when an appropriate answer to the customer query cannot be found. Such escalation of the customer query can lead to a successful outcome for the customer. At the completion of the interaction between the customer and the agent, the customer may be asked to rate the interaction. Following receipt of the customer's rating, the customer may be thanked and the interaction completed.

Figure 3:
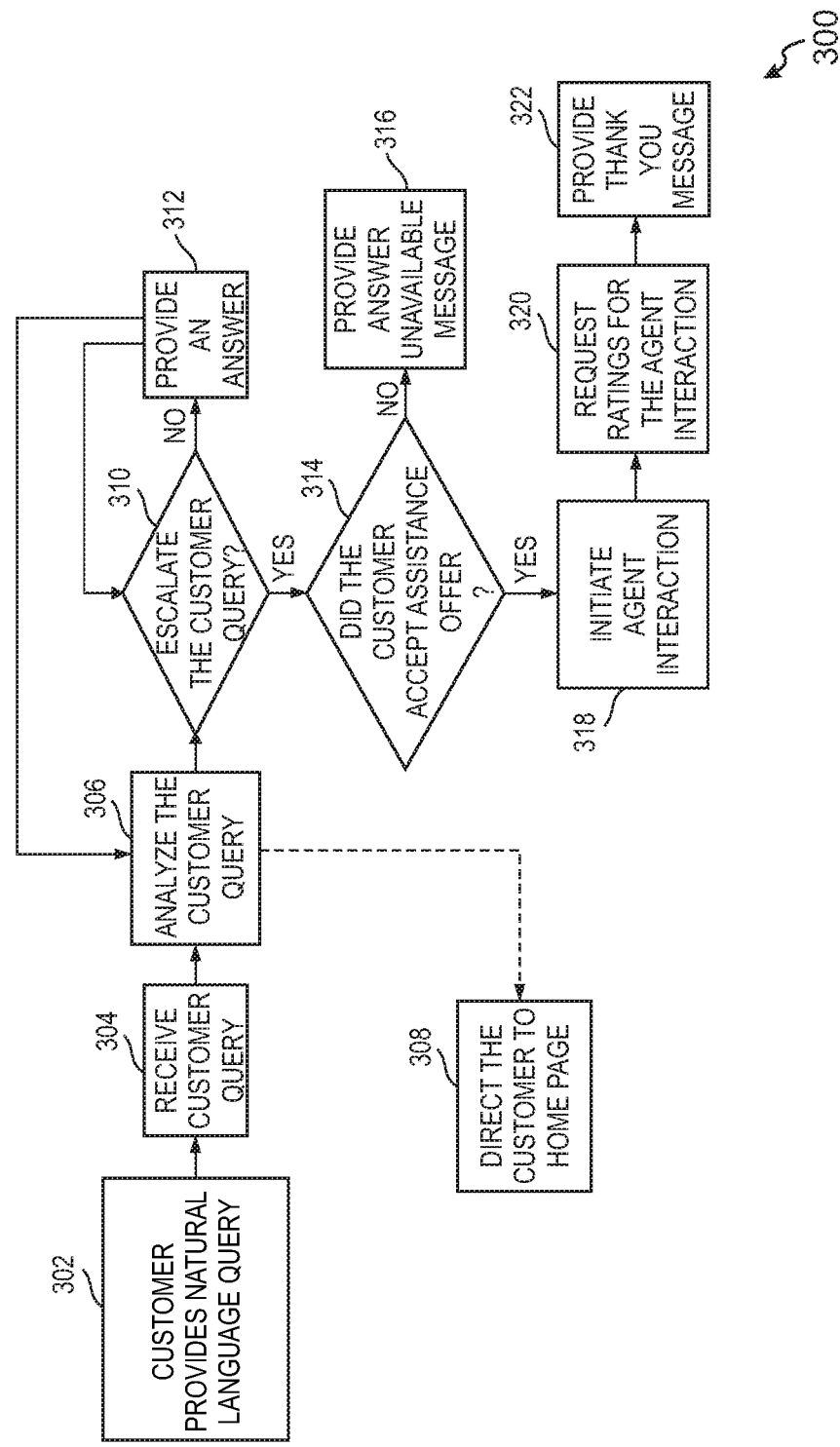
FIG. 3 shows an example sequence of escalation steps performed by the apparatus of FIG. 1 upon receiving a natural language query from a customer in accordance with an embodiment of the invention.

FIG. 3 shows an example sequence of escalation steps performed by the apparatus 100 of FIG. 1 upon receiving a natural language query of a customer in accordance with an embodiment of the invention. The sequence of escalation steps is hereinafter referred to as sequence 300.

At step 302 of the sequence 300, a customer provides a natural language query. The customer may provide the natural language query by interacting with a virtual assistant widget that is installed on the customer's personal device or displayed on a webpage that the customer is currently browsing, as will be explained later with reference to FIG. 4. At step 304, the customer's natural language query is received by the apparatus 100 using the communication interface 108 (shown in FIG. 1). At step 306, the apparatus 100 analyzes the natural language query using a multi-level framework of natural language models as explained with reference to FIGS. 1 and 2. In an illustrative example, it is determined that no answer to the query can be found. In such a case, at step 308, the apparatus 100 may direct the customer to a home page.

If it is determined upon analyzing the query that one or more appropriate answers can be found, then step 310 is performed. At step 310, the apparatus determines whether to escalate the query or not. The determination to escalate may be made based on additional response from the customer, on business rules of an enterprise, and so on. For example, an additional response provided by the customer may be missing information, such as a banking account number or a card expiry date. In such a scenario, the query may have to be escalated to an agent to assist the customer.

In another example scenario, the customer may explicitly request an interaction with an agent, and such intent of the customer may serve as an indication for the apparatus 100 to escalate the query. In another illustrative example, the enterprise may adopt a business rule, where a sale related request from a customer, such as for example, a request for a new card, may be escalated to a sales agent. In other example scenarios, an enterprise may adopt business rules to escalate a query, when the query relates to an emergency situation, such as a fraud or identity theft related situation. If the apparatus 100 chooses not to escalate the query then, at step 312, an answer to the query may be provided to the customer. Upon provisioning the answer at step 312, the sequence 300 may again return to step 310 to determine whether escalation is appropriate or not, or the sequence 300 may return to step 306 for further analysis. If escalation is determined to be appropriate then an offer for assistance, such as for example chat assistance, is provisioned to the customer. At step 314, it is determined whether the customer accepted the offer for assistance. If the customer declines the offer for assistance, then at step 316, an unavailable message, i.e. a message suggesting requested answer is not available, is displayed to the customer.

If the customer responds by accepting the offer for assistance, then at step 318 of the sequence 300, a customer interaction with an agent is initiated. The agent can interact with the customer using chat, text, and so on. At step 320, a rating of the interaction between the agent and the customer can be requested following the customer-agent interaction. At step 322, a "thank you" message is sent to the customer following any ratings that are received from the customer. In an example scenario, the rating responses are used to improve the search criteria, agent scripts, interaction methods, and the like.

Figure 4:
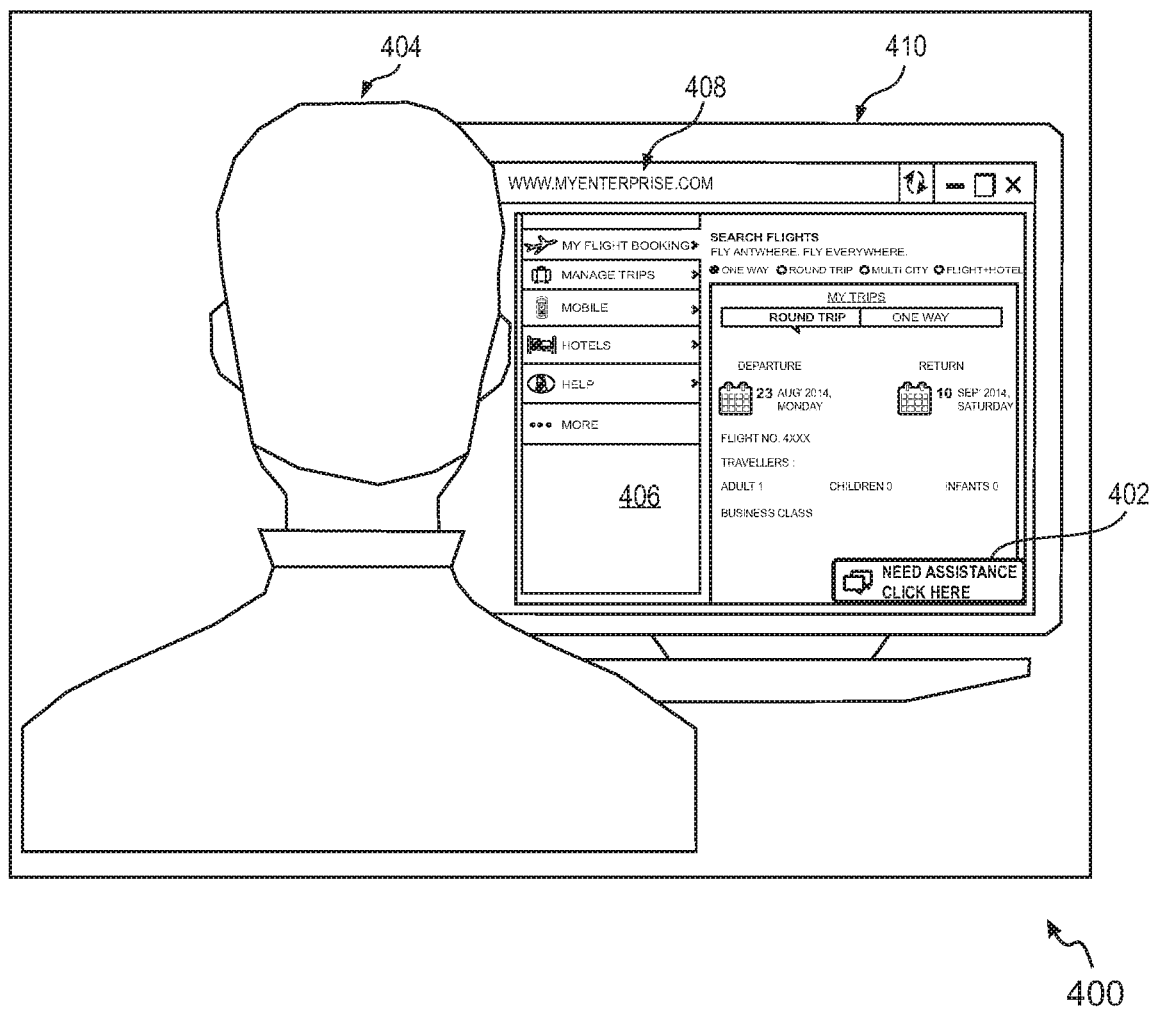
FIG. 4 shows an example representation of a chat widget offering assistance to a customer browsing a webpage of an enterprise website in accordance with an embodiment of the invention.

FIG. 4 shows an example representation of a chat widget 402 offering assistance to a customer 404 browsing a webpage 406 of an enterprise website 408 in accordance with an embodiment of the invention. In at least one example embodiment, the apparatus 100 explained with reference to FIG. 1, may be configured to cause display of widgets, such as the chat widget 402, on one or more webpages of the enterprise website 408. As explained in FIG. 1, the communication interface 108 is in operative communication with remote entities, such as a Web server hosting the enterprise website 408. The processor 102, using a chat application API of a chat application stored in the memory 104, may cause display of the chat widget 402 on several webpages of the enterprise website 408.

In at least one example scenario, a customer of an enterprise offering may visit the enterprise website 408 using a Web browser application associated with an electronic device 410. The electronic device 410 is depicted to be a personal computer for illustration purposes. The customer may visit the enterprise website 408 using other electronic devices, such as laptops, tablet computers, smartphones, wearable devices, and the like. Upon visiting the enterprise website 408, the customer may view the chat widget 402 displayed in a bottom-right corner portion of the webpage 406. The chat widget 402 is exemplarily depicted to display text 'Need Assistance, Click Here.' The chat widget 402 may display other text messages offering assistance to the customer. If the customer requires assistance, the customer may provide an input, such as click or a touch input, corresponding to the chat widget 402. Upon receiving, such a customer input, the apparatus 100 may be caused to display a dialog screen (or a chat window) to the customer. The customer may provide a natural language query in the dialog screen and thereafter receive an appropriate response, as will be explained with reference to FIG. 5.

Figure 5:
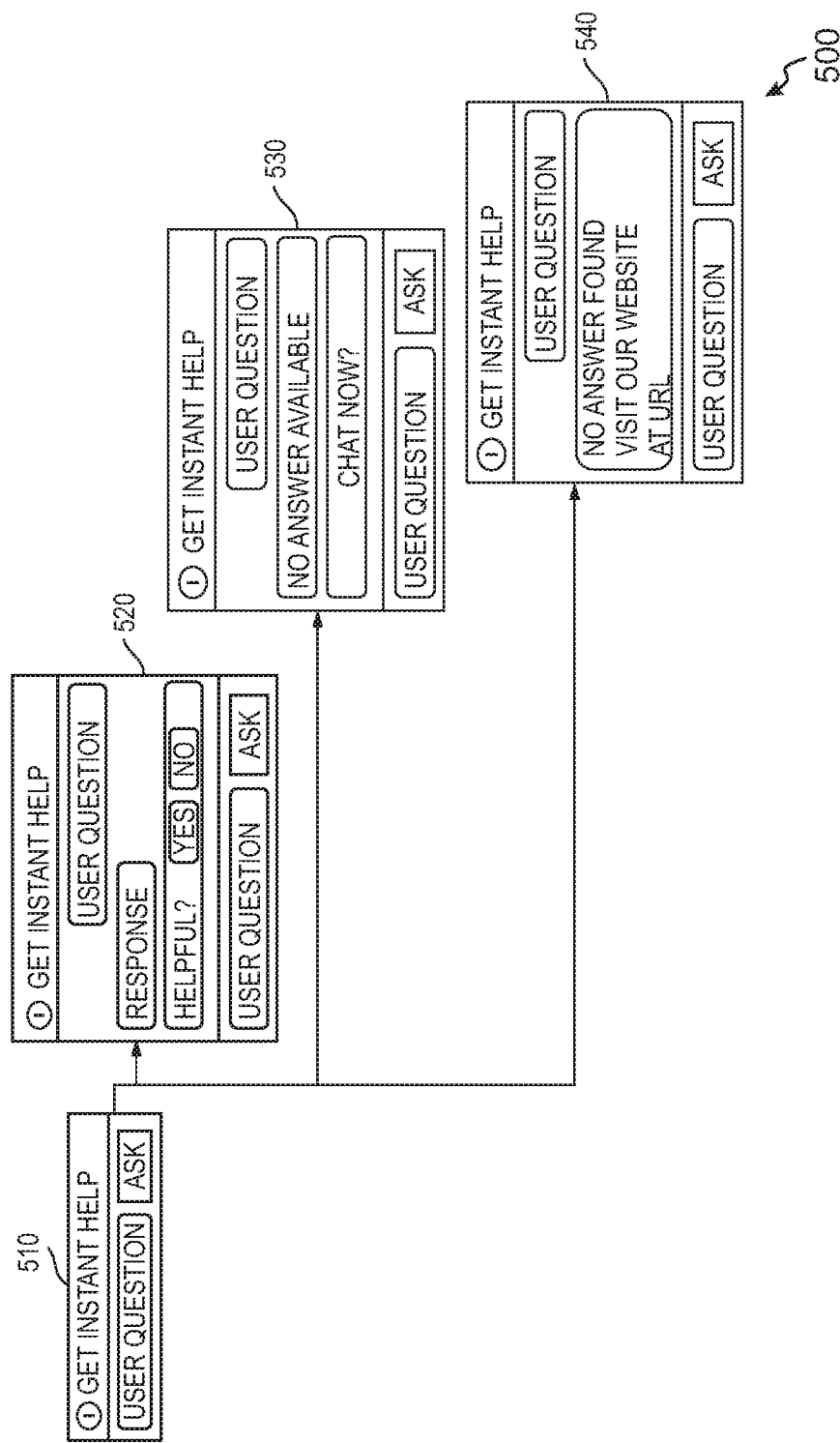
FIG. 5 shows an example representation of dialog screens for illustrating various interaction scenarios possible during handling of a natural language query of a customer in accordance with an embodiment of the invention.

Referring now to FIG. 5, an example representation 500 of dialog screens is shown for illustrating various interaction scenarios possible during handling of a natural language query of a customer in accordance with an embodiment of the invention. It is understood that the dialog screens may be displayed to the customer on a customer device, in a widget, in an application, on a webpage, and so on. As explained with reference to FIG. 4, the apparatus 100 may be caused to display a dialog screen upon receiving a customer input seeking assistance. The customer can enter a natural language question (also referred to herein as a query) and submit the query. The query can be submitted using speech and an IVR system, text, a mobile app, and so on.

At 510, a dialog screen is depicted showing a query entered and submitted by a customer though an interface associated with a customer device. At 520, a dialog screen is depicted illustrating a scenario where an appropriate response is found and presented to the customer. The customer can then respond that the response was helpful or not, ask another question, and so on.

At 530, a dialog screen is depicted illustrating a scenario where an appropriate response is not available in QA domains stored in the memory 104. In such cases, various offers can be made to the customer including an invitation to a chat session. The customer can then accept the chat invitation or not, ask another question, and so on.

At 540, a dialog screen is depicted illustrating a scenario where no appropriate answer is found and the customer declines a chat invitation or other action. In such a case a link to a webpage is offered to the customer. Accessing of the link connects the customer to a general webpage, a specific webpage, an FAQ webpage, and so on. It is understood that at any point during the interaction, the customer can ask another question, exit the application/widget, and so on.

A method for managing natural language queries is explained next with reference to FIG. 6.

Figure 6:
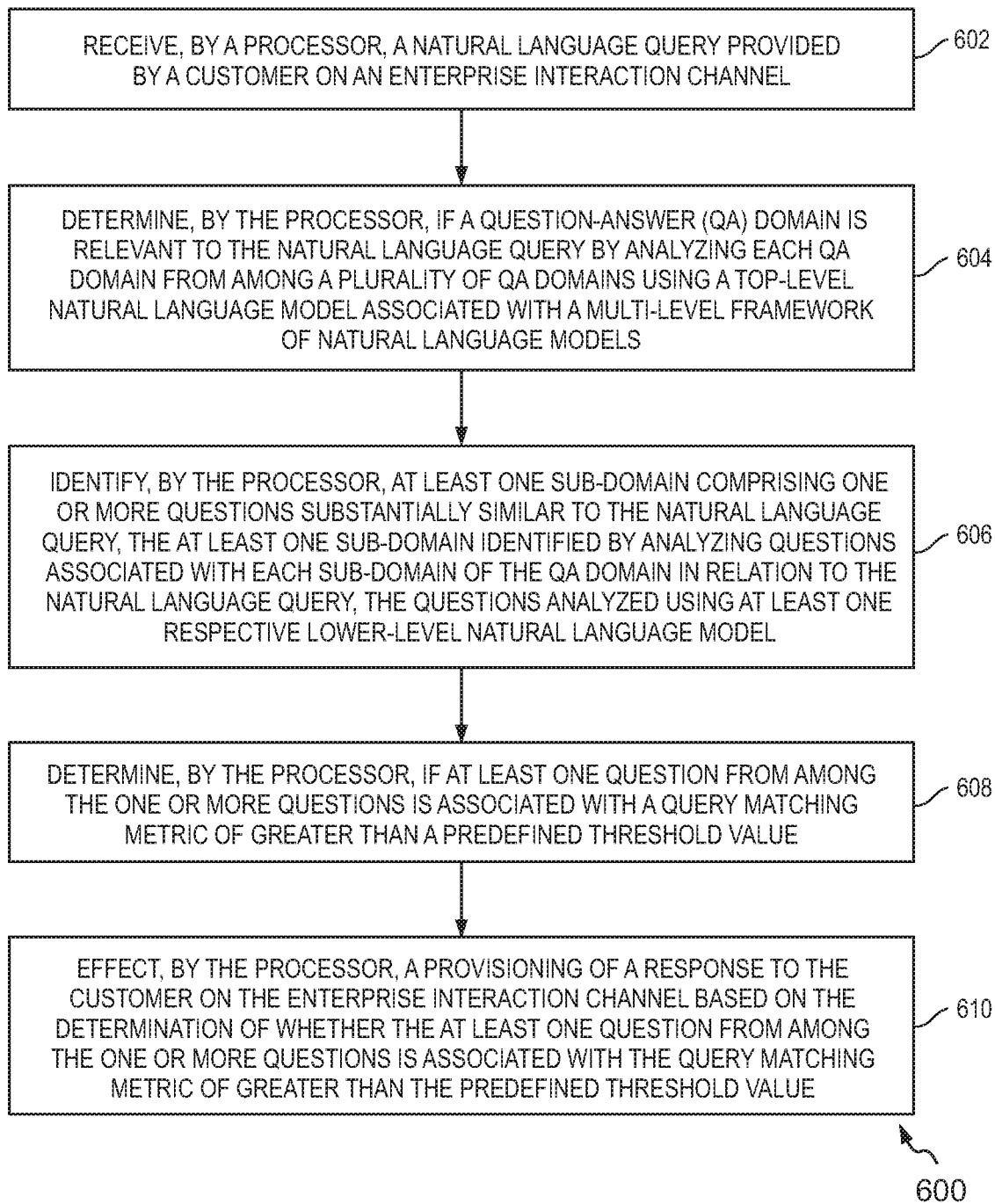
FIG. 6 is an example flow diagram of a method for managing natural language queries of customers in accordance with an embodiment of the invention.

FIG. 6 is a flow diagram of an example method 600 for managing natural language queries of customers in accordance with an embodiment of the invention. The method 600 depicted in the flow diagram may be executed by, for example, the apparatus 100 explained with reference to FIGS. 1 to 5. Operations of the flowchart, and combinations of operation in the flowchart, may be implemented by, for example, hardware, firmware, a processor, circuitry, and/or a different device associated with the execution of software that includes one or more computer program instructions. The operations of the method 600 are described herein with help of the apparatus 100. For example, one or more operations corresponding to the method 600 may be executed by a processor, such as the processor 102 of the apparatus 100. Although the one or more operations are explained herein to be executed by the processor alone, it is understood that the processor is associated with a memory, such as the memory 104 of the apparatus 100, which is configured to store machine executable instructions for facilitating the execution of the one or more operations. The operations of the method 600 can be described and/or practiced by using an apparatus other than the apparatus 100. The method 600 starts at step 602.

At step 602 of the method 600, a natural language query provided by a customer on an enterprise interaction channel is received by a processor. The natural language query posed by the customer may be in a voice, text, chat, or any other form. Moreover, the natural language query may be received from any of various interaction channels, such as a Web channel, a native application channel, a chat channel, a voice channel, etc. and from any of various personal devices of the customer, such as for example, a mobile phone, a Smartphone, a laptop, a tablet computer, a personal computer, a wearable communication device, and the like. In an embodiment, if the natural language query is in speech form, then the processor may use automatic speech recognition (ASR) and statistical learning models (SLM) to perform speech-to-text conversion and convert the natural language query in speech form to a text form.

At step 604 of the method 600, it is determined whether a question-answer (QA) domain is relevant to the natural language query by the processor. As explained with reference to FIG. 1, a storage location such as the memory 104, may store a plurality of question-answer (QA) domains. Each QA domain includes a plurality of questions typically asked by customers for a particular category along with corresponding answers. The QA domains may be related to a product offering, a service offering, a type of concern, and the like. For example, a QA domain may be related to 'mobile phones' offered by an enterprise, 'Voice and data plans' offered by the enterprise, 'billing', and the like. Such QA domains may include typical questions asked by customers related to respective domains along with corresponding answers.

Each QA domain is further associated with one or more sub-domains. Each sub-domain further includes questions and corresponding answers that narrow down the scope of questions to more specific types of questions. For example, a sub-domain of a QA domain related to 'Data Plans' category may be related to data plans offered by a telecommunication enterprise. Such a sub-domain may include typical questions asked by customers related to data usage such as, for example, questions such as 'What is the limit for data usage associated with Plan P2?', 'How do I top-up data if I exceed my limit?, and the like. The sub-domain may include questions related to the respective sub-category along with corresponding answers.

Further, the memory may store a hierarchy of natural language models with a natural language model at a top level and several natural language models in each of several lower levels, thereby configuring a multi-level framework of natural language models. Each natural language model is configured to analyze a natural language query using a set of respective rules and to identify an intent category of the natural language query.

The processor may be caused to apply the top-level natural language model in the multi-level framework of natural language models to the customer's natural language query to first determine the QA domain, i.e. a database, most likely to contain one or more appropriate answers to the customer's query. In an illustrative example, the top-level natural language model may be configured to parse the natural language query to generate unigrams, bigrams and/or n-grams and apply rules comparing the generated n-grams with predefined list of words or phrases corresponding to respective categories to identify the QA domain most likely to contain one or more appropriate responses to the customer's query.

At step 606 of the method 600, at least one sub-domain including one or more questions substantially similar to the natural language query is identified by the processor. As explained above, each QA domain is associated with one or more sub-domains. Further, each sub-domain is associated with at least one respective lower-level natural language model, i.e. a natural language model including specific rules to identify questions related to the sub-domain. The rules may be configured to compare n-grams from parsing the natural language query with predefined list of words or phrases corresponding to respective categories as explained above. The questions in each sub-domain of the relevant QA domain may be analyzed using respective lower level natural language model to identify a sub-domain, which includes questions substantially similar to the natural language query. More specifically, using additional lower-level natural language models, the search is further refined within the relevant QA domain to determine whether one or more appropriate answers to the query can be found or not.

At step 608 of the method 600, it is determined whether at least one question from among the one or more questions is associated with a query matching metric of greater than a predefined threshold value. More specifically, if a particular sub-domain is identified to have several questions, which are similar to the natural language query, then a level of a match between the natural language query and each question in the sub-domain identified to be similar to the natural language query may be determined. In an embodiment, a query matching metric may be computed to determine the level of match between the natural language query and questions identified to be similar to the natural language query. The computation of the query matching metric may be performed as explained in FIG. 1 and is not explained again herein.

In at least one example embodiment, it is determined whether any question in the sub-domain is associated with a query matching metric of greater than a predefined threshold value. In an illustrative example, the predefined threshold value may be set to 0.85, i.e. 85% match. Such a value of the predefined threshold may be set based on empirical observations of several research studies and also feedback received from customers regarding the relevancy of answers provided to the respective natural language queries. The predefined threshold value of 0.85 is mentioned herein for illustration purposes and is not intended to limit the scope of the invention. Indeed, the predefined threshold value may assume various other values, which may vary based on the QA domain.

At step 610 of the method 600, a provisioning of a response to the customer on the enterprise interaction channel is effected by the processor based on the determination of whether the at least one question from among the one or more questions is associated with the query matching metric of greater than the predefined threshold value. In an embodiment, if a question with the query matching metric of greater than the predefined threshold value is identified, then the answer of the corresponding question is provided to the customer as the response.

In an embodiment, provisioning of a follow-up question to the customer is effected if no question is associated with a query matching metric of greater than the predefined threshold value. The follow-up question is configured to seek clarification on the natural language query from the customer. In response to a reply to the follow-up question received from the customer, the analysis of the reply using the multi-level framework of natural language models may be performed to provide an appropriate response to the customer.

In an embodiment, a provisioning of an offer for agent assistance as the response to the customer is effected if no QA domain from among the plurality of QA domains is determined to be relevant to the natural language query. The provisioning of the offer and the subsequent facilitating of the interaction may be performed as explained with reference to FIG. 5.

Another method for managing natural language queries of customers is explained with reference to FIG. 7.

Figure 7:
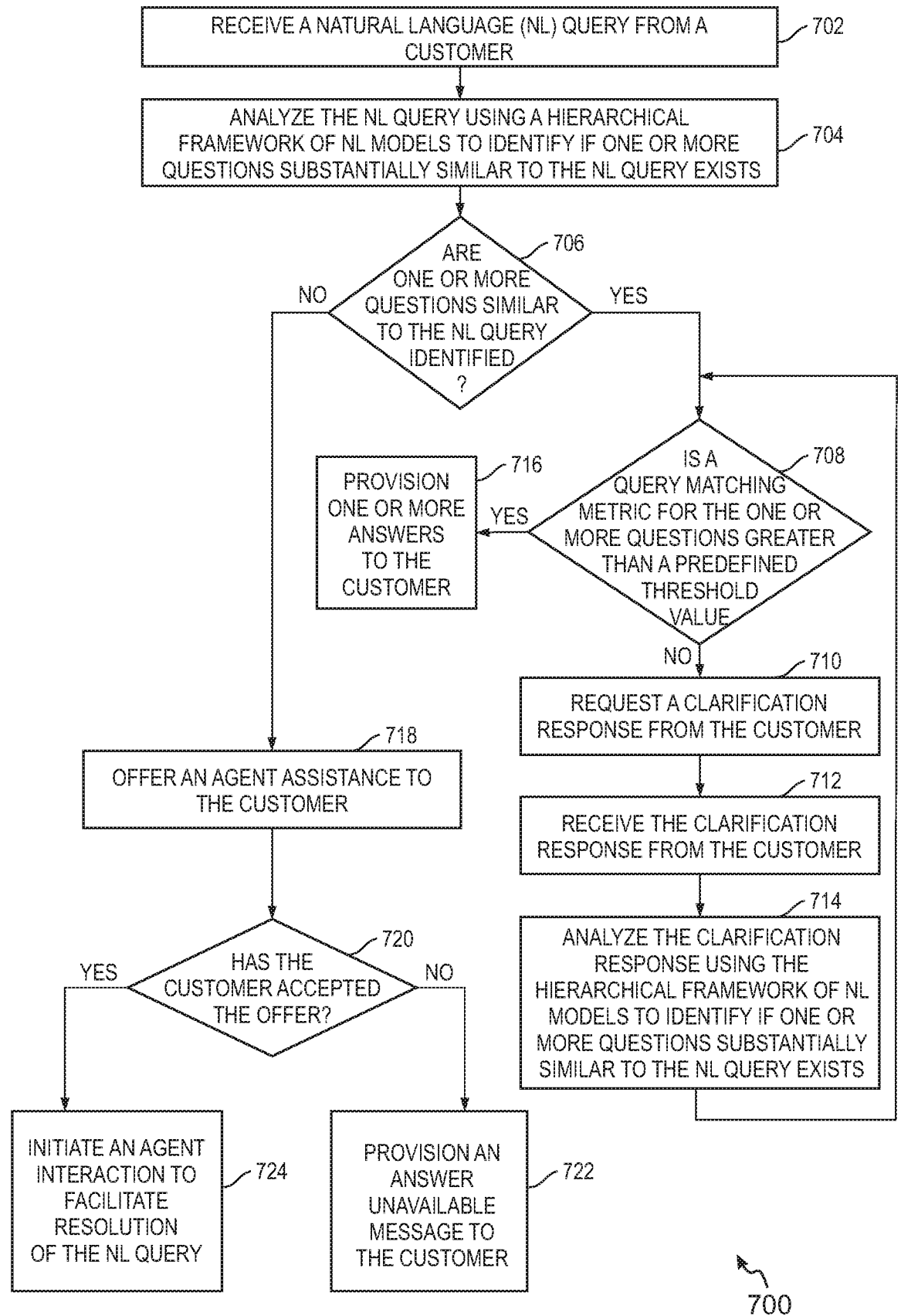
FIG. 7 is an example flow diagram of a method for managing natural language queries of customers in accordance with another embodiment of the invention.

Referring now to FIG. 7, a flow diagram of an example method 700 for managing natural language queries of customers is shown in accordance with another embodiment of the invention. The various steps and/or operations of the flow diagram, and combinations of steps/operations in the flow diagram, may be implemented by, for example, hardware, firmware, a processor, circuitry, and/or by an apparatus such as the apparatus 100 of FIG. 1 and/or by a different device associated with the execution of software that includes one or more computer program instructions. The method 700 starts at step 702.

At step 702 of the method 700, a natural language query is received from a customer. It us understood that the query may be provided by the customer using one or more interaction channels from among voice, chat, and/or text interaction channels. Moreover, the customer may use any kind of electronic personal device, for example, a phone, a laptop, a tablet, a wearable device, etc. to provision the query in natural language form.

At step 704 of the method 700, the natural language query is analyzed using a hierarchical framework of natural language models, such as those explained with reference to FIGS. 1 and 2, to identify if one or more questions similar to the natural language query exist. More specifically, the query is analyzed using a top-level natural language model to determine the domain that includes one or more answers to the natural language query of the customer. The top-level natural language model may be used to determine a broad category for the natural language query. If a particular top-level domain is identified to include the answer, then the search for the domain is further refined using lower-level, i.e. secondary and/or tertiary levels of natural language models, to identify if one or more answers to the natural language query exist.

At step 706 of the method 700, it is determined whether one or more questions substantially similar to the natural query are identified or not. If one or more questions substantially similar to the natural language query are identified, then at step 708 of the method 700, it is determined whether a query matching metric of the one or more questions is greater than a predefined threshold value or not. It is understood that various known techniques such as, for example, cosine similarity, etc. may be used to determine the quality of the match. In at least one embodiment, the predefined threshold value may be chosen to be a marker on a pre-defined scale such as, for example, a scale with markings, such as a 'good match', an 'average match', a 'low match', etc. In some embodiments, the threshold may be chosen to be a numerical value indicative of the quality of match. For example, a numerical value of '0.5' may indicate an average match between the one or more answers and the natural language query, whereas numerical values of '0.35' and '0.75' indicate a poor match and a good match, respectively.

If it is determined that the query matching metric of the one or more questions is not greater than the predefined threshold value, then at step 710 of the method 700, a clarification response is requested from the customer. In an embodiment, a follow-up question may be provided to the customer to request the customer to provide further information or elaborate the query. For example, in an illustrative scenario, a customer may provide a following query "I want to learn more about your new card program." Although the processor understands that the query is related to 'cards' and has one or more answers in response to the query, it may not have enough information to respond to the query satisfactorily. In such a scenario, a clarification response may be requested from the customer. For example, the request for clarification response may be embodied as the following question: "Which type of program are you interested in?"

At step 712 of the method 700, the clarification response is received from the customer. In the example illustrated above, in response to the request for clarification response, the customer may provide the clarification response as 'travel rewards programs,' indicating that the customer intends to know more about the new card for travel rewards programs.

At step 714 of the method 700, the clarification response is analyzed using the hierarchical framework of natural language models to identify if one or more suitable answers to the natural language query exist. Steps 708 to 714 are repeated until one or more questions with a query matching metric greater than the predefined threshold value is identified. If it is determined that the query matching metric is greater than the predefined threshold value, then at step 716 of the method 700, one or more answers, in order of relevance or sorted based on domain or otherwise, are provisioned to the customer.

If it is determined that one or more questions with the query matching metric of greater than the predefined threshold value are not available and the natural language query must be escalated, then an agent assistance is offered to the customer at step 718 of the method 700. At step 720 of the method 700, it is determined whether the offer for the agent assistance is accepted or not. If the customer declines the offer for the agent assistance, then a message citing answer unavailability is provisioned to the customer at step 722 of the method 700. The method 700 ends at step 722 of the method 700.

If the customer accepts the offer for agent assistance then an agent interaction is initiated at step 724 of the method 700 to facilitate resolution to the customer query. In at least one embodiment, the customer may be requested to rate the experience and a 'thank you' message may be provisioned to the customer.

Figure 8:
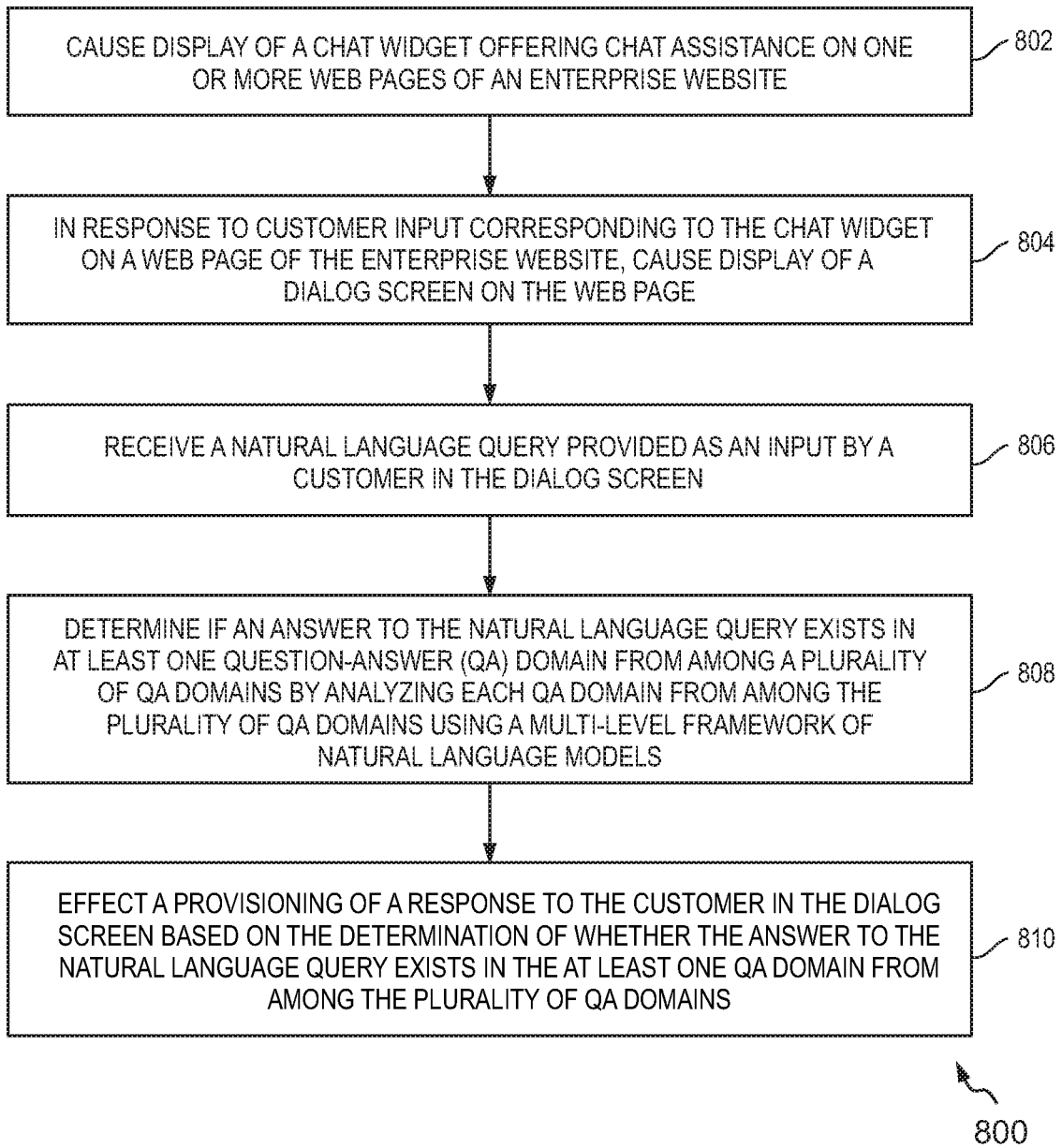
FIG. 8 is an example flow diagram of a method for managing natural language queries of customers in accordance with another embodiment of the invention.

FIG. 8 is a flow diagram of an example method 800 for managing natural language queries of customers, in accordance with another embodiment of the invention. The various steps and/or operations of the flow diagram, and combinations of steps/operations in the flow diagram, may be implemented by, for example, hardware, firmware, a processor, circuitry, and/or by an apparatus such as the apparatus 100 of FIG. 1 and/or by a different device associated with the execution of software that includes one or more computer program instructions. The method 800 starts at step 802.

At step 802 of the method 800, a chat widget offering chat assistance on one or more webpages of an enterprise website is displayed. At website 804 of the method 800, display of a dialog screen is caused on the webpage in response to customer input corresponding to the chat widget on a webpage of the enterprise website. The display of the chat widget and the dialog screen may be performed as explained with reference to FIGS. 4 and 5, respectively, and is not explained again herein.

At step 806 of the method 800, a natural language query provided as an input by a customer in the dialog screen is received. At step 808 of the method 800, it is determined whether an answer to the natural language query exists in at least one question-answer (QA) domain from among a plurality of QA domains analyzing each QA domain from among the plurality of QA domains using a multi-level framework of natural language models. The analysis of the natural language query using the multi-level framework of natural language models may be performed as explained with reference to steps 606 and 608 of the method 600 and is not explained again herein.

At step 810 of the method 800, a provisioning of a response to the customer in the dialog screen based on the determination of whether the answer to the natural language query exists in the at least one question-answer (QA) domain from among a plurality of QA domains. The provisioning of the response may be performed as explained with reference to step 610 of the method 600 explained with reference to FIG. 6 and is not explained herein.

Various embodiments disclosed herein provide numerous advantages. The techniques disclosed herein enable enterprises to handle a customer query quickly and efficiently by applying a multi-level framework, such as a hierarchical framework of natural language models to a natural language query. When an appropriate answer to the query is found, the answer is presented to the customer. When an appropriate answer cannot be found, then the customer is offered options that can help lead to the appropriate answer. The options include a link to a webpage (homepage, FAQ, etc.), an offer to provide an additional query or refine the query, and an offer to chat with an agent. Such escalation of the handling of the customer request quickly and efficiently resolves the customer query, thereby improving chances of a sale or improving a customer interaction experience. In some embodiments, the suggested techniques may also aid in improving efficiency and accuracy of emergency service queries.

Although the present invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry, for example, complementary metal oxide semiconductor (CMOS) based logic circuitry; firmware; software and/or any combination of hardware, firmware, and/or software, for example, embodied in a machine-readable medium. For example, the apparatuses and methods may be embodied using transistors, logic gates, and electrical circuits, for example, application specific integrated circuit (ASIC) circuitry and/or in Digital Signal Processor (DSP) circuitry.

Particularly, the apparatus 100, the processor 102, the memory 104, the I/O module 106, and the communication interface 108 may be enabled using software and/or using transistors, logic gates, and electrical circuits, for example, integrated circuit circuitry such as ASIC circuitry. Various embodiments of the invention may include one or more computer programs stored or otherwise embodied on a computer-readable medium, wherein the computer programs are configured to cause a processor or computer to perform one or more operations, for example, operations explained herein with reference to FIGS. 6, 7, and 8. A computer-readable medium storing, embodying, or encoded with a computer program, or similar language, may be embodied as a tangible data storage device storing one or more software programs that are configured to cause a processor or a computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media, such as floppy disks, magnetic tapes, hard disk drives, etc.; optical magnetic storage media, e.g. magneto-optical disks; CD-ROM (compact disc read only memory); CD-R (compact disc recordable); CD-R/W (compact disc rewritable); DVD (Digital Versatile Disc); BD (BLU-RAY® Disc); and semiconductor memories, such as mask ROM, PROM (programmable ROM), EPROM (erasable PROM), flash memory, RAM (random access memory), etc. Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line, e.g. electric wires, and optical fibers, or a wireless communication line.

Various embodiments of the invention, as discussed above, may be practiced with steps and/or operations in a different order, and/or with hardware elements in configurations, which are different than those which, are disclosed. Therefore, although the invention has been described based upon these exemplary embodiments, it is noted that certain modifications, variations, and alternative constructions may be apparent and well within the spirit and scope of the invention.

Although various exemplary embodiments of the invention are described herein in a language specific to structural features and/or methodological acts, the subject matter defined in the appended Claims is not necessarily limited to the specific features or acts described above. Rather, the specific features and acts described above are disclosed as exemplary forms of implementing the Claims.

The invention claimed is:

1. A computer-implemented method, comprising:

receiving, by a processor, a natural language query provided by a customer on an enterprise interaction channel;

performing a multi-step search by:

in a first step of the multi-step search, determining, by the processor, when a question-answer (QA) domain is relevant to the natural language query, the relevancy of the QA domain determined from among a plurality of QA domains by analyzing each QA domain from among the plurality of QA domains using a top-level natural language model associated with a multi-level framework of natural language models, wherein each QA domain is associated with one or more sub-domains and each sub-domain from among the one or more sub-domains is associated with at least one respective lower-level natural language model;

in a second step subsequent to the first step of the multi-step search, for the QA domain determined to be relevant to the natural language query, identifying, by the processor, at least one sub-domain comprising one or more questions substantially similar to the natural language query, the at least one sub-domain identified by analyzing questions associated with the each sub-domain of the QA domain in relation to the natural language query, the questions analyzed using the at least one respective lower-level natural language model;

in a third step subsequent to the second step, determining, by the processor, when at least one question from among the one or more questions of the at least one sub-domain is associated with a query matching metric of greater than a predefined threshold value, wherein the query matching metric is generated by comparing individual words and a sequence of words of the natural language query with the one or more questions; and effecting, by the processor, a provisioning of a response to the customer on the enterprise interaction channel when a determination is made that the at least one question from among the one or more questions is associated with the query matching metric of greater than the predefined threshold value.

2. The method of claim 1, further comprising:

effecting provisioning of at least one answer as the response to the customer when the at least one question is associated with the query matching metric of greater than the predefined threshold value, the at least one answer corresponding to the at least one question.

3. The method of claim 1, further comprising:

effecting provisioning of a link to an enterprise webpage as the response to the customer query when it is determined that there is no QA domain among the plurality of QA domains that is relevant to the natural language query.

4. The method of claim 1, further comprising:

effecting provisioning of an offer for agent assistance as the response to the customer query when it is determined that there is no QA domain among the plurality of QA domains that is relevant to the natural language query.

5. The method of claim 4, further comprising:
facilitating, by the processor, an interaction between the customer and an agent subsequent to receiving an acceptance of the offer for agent assistance from the customer.

6. The method of claim 5, wherein the agent is any of an automated agent, a smart virtual assistant, and a human agent.

7. The method of claim 5, further comprising:
effecting, by the processor, a provisioning of a request to the customer to provide a rating for the agent subsequent to the customer's interaction with the agent.

8. The method of claim 4, further comprising:
effecting, by the processor, a provisioning of a message indicative of an unavailability of an answer to the natural language query when an acceptance of the offer for agent assistance is not received from the customer.

9. The method of claim 1, further comprising:
effecting provisioning of a follow-up question when no question from among the one or more questions is associated with the query matching metric of greater than the predefined threshold value, the follow-up question configured to seek clarification on the natural language query from the customer.

10. The method of claim 9, further comprising:
receiving, by the processor, a reply from the customer as a response to the follow-up question; and
repeating, by the processor, the steps of:
determining a relevant QA domain from among the plurality of QA domains;
identifying a sub-domain from the relevant QA domain comprising the one or more questions substantially similar to the natural language query;
determining when the at least one question from among the one or more questions is associated with the query matching metric of greater than the predefined threshold value; and
effecting a provisioning of a response to the customer.

11. The method of claim 1, wherein the provisioning of the response is effected based on one or more predefined business rules.

12. An apparatus, comprising:
at least one processor; and
a memory having stored therein machine executable instructions, that when executed by the at least one processor, cause the apparatus to:
receive a natural language query provided by a customer on an enterprise interaction channel;
perform a multi-step search by:
in a first step of the multi-step search, determine when a question-answer (QA) domain is relevant to the natural language query, the relevancy of the QA domain determined from among a plurality of QA domains by analyzing each QA domain from among the plurality of QA domains using a top-level natural language model associated with a multi-level framework of natural language models, wherein each QA domain is associated with one or more sub-domains and each sub-domain from among the one or more sub-domains is associated with at least one respective lower-level natural language model;
in a second step subsequent to the first step of the multi-step search, for the QA domain determined to be relevant to the natural language query, identify at least one sub-domain comprising one or more questions substantially similar to the natural language query, the at least one sub-domain identified by analyzing questions associated with the each sub-domain of the QA domain in relation to the natural language query, the questions analyzed using the at least one respective lower level natural language model;
in a third step subsequent to the second step of the multi-step search, determine when at least one question from among the one or more questions of the at least one sub-domain is associated with a query matching metric of greater than a predefined threshold value, wherein the query matching metric is generated by comparing individual words and a sequence of words of the natural language query with the one or more questions; and
effect a provisioning of a response to the customer on the enterprise interaction channel when a determination is made that the at least one question from among the one or more questions is associated with the query matching metric of greater than the predefined threshold value.

13. The apparatus of claim 12, wherein the apparatus is further caused to:
effect provisioning of at least one answer as the response to the customer when the at least one question is associated with the query matching metric of greater than the predefined threshold value, the at least one answer corresponding to the at least one question.

14. The apparatus of claim 12, wherein the apparatus is further caused to:
effect provisioning of a link to an enterprise webpage as the response to the customer when it is determined that there is no QA domain from among the plurality of QA domains that is relevant to the natural language query.

15. The apparatus of claim 12, wherein the apparatus is further caused to:
effect provisioning of an offer for agent assistance as the response to the customer when it is determined that there is no QA domain from among the plurality of QA domains that is relevant to the natural language query; and
facilitate an interaction with an agent subsequent to receiving an acceptance of the offer for agent assistance from the customer.

16. The apparatus of claim 15, wherein the apparatus is further caused to:
effect a provisioning of a message indicative of an unavailability of an answer to the natural language query when the acceptance of the offer for agent assistance is not received from the customer.

17. The apparatus of claim 12, wherein the apparatus is further caused to:
effect provisioning of a follow-up question when it is determined that there is no question from among the one or more questions that is associated with the query matching metric of greater than the predefined threshold value, the follow-up question configured to seek clarification on the natural language query from the customer.

18. The apparatus of claim 17, wherein the apparatus is further caused to:
receive a reply from the customer as a response to the follow-up question; and
repeat the steps of:
determining a relevant QA domain from among the plurality of QA domains;

identifying a sub-domain from the relevant QA domain comprising the one or more questions substantially similar to the natural language query;

determining when the at least one question from among the one or more questions is associated with a matching metric of greater than the predefined threshold value; and effecting a provisioning of a response to the customer.

19. A computer-implemented method, comprising:

causing, by a processor, display of a chat widget offering chat assistance on one or more webpages of an enterprise website;

in response to customer input corresponding to the chat widget on a webpage of the enterprise website, causing display of a dialog screen, by the processor, on the webpage;

receiving, by the processor, a natural language query provided as an input by a customer in the dialog screen;

performing a multi-step search by:
in a first step of the multi-step search, determining, by the processor, when an answer to the natural language query exists in at least one question-answer (QA) domain from among a plurality of QA domains by analyzing each QA domain from among the plurality of QA domains using a hierarchical framework of natural language models in a second step subsequent to the first step, determining, by the processor, when at least one question from among one or more questions of the at least one QA domain is associated with a query matching metric of greater than a predefined threshold value, wherein the query matching metric is generated by comparing individual words and a sequence of words of the natural language query with the one or more questions; and effecting, by the processor, a provisioning of a response to the customer in the dialog screen when a determination is made that the at least one question from among the one or more questions is associated with the query matching metric of greater than the predefined threshold value.

20. The method of claim 19, wherein determining whether the answer to the natural language query exists in the plurality of QA domains comprises:

determining when the QA domain is relevant to the natural language query, the relevancy of the QA domain determined from among the plurality of QA domains by analyzing each QA domain from among the plurality of QA domains using a top-level natural language model associated with the hierarchical framework of natural language models, wherein the each QA domain is associated with one or more sub-domains and each sub-domain from among the one or more sub-domains is associated with at least one respective lower-level natural language model; and for the QA domain determined to be relevant to the natural language query, identifying, at least one sub-domain comprising one or more questions substantially similar to the natural language query, the at least one sub-domain identified by analyzing questions associated with the each sub-domain of the QA domain in relation to the natural language query, the questions analyzed using the at least one respective lower-level natural language model.

21. The method of claim 20, further comprising:

effecting provisioning of a follow-up question when it is determined that there no question from among the one or more questions that is associated with the query matching metric of greater than the predefined threshold value, the follow-up question configured to seek clarification on the natural language query from the customer.

22. The method of claim 21, further comprising:

receiving, by the processor, a reply from the customer as a response to the follow-up question; and repeating, by the processor, the steps of:

determining a relevant QA domain from among the plurality of QA domains;

identifying a sub-domain from the relevant QA domain comprising the one or more questions substantially similar to the natural language query;

determining when the at least one question from among the one or more questions is associated with a matching metric of greater than the predefined threshold value; and effecting a provisioning of a response to the customer.

23. The method of claim 20, further comprising:

effecting provisioning of an offer to the customer to interact with a live agent as the response to the customer when it is determined that the answer to the natural language query does not exist in the plurality of QA domains.

24. The method of claim 23, further comprising:

effecting, by the processor, a provisioning of a message indicative of an unavailability of the answer to the natural language query when the customer does not accept the offer to interact with the live agent.

25. The method of claim 1, wherein the relevancy of the QA domain is determined by:

parsing the natural language query to generate n-grams;

employing the top-level natural language model to calculate a correspondence of the natural language query with the plurality of QA domains using one or more of the n-grams;

employing a lower-level natural language model to calculate a correspondence of the natural language query with a plurality of sub-domains in the QA domain using one or more of the n-grams;

determining a relevance of questions in the at least one sub-domain to the natural language query by computing the query matching metric for the questions in the at least one sub-domain to determine if any of the query matching metrics exceed the predefined threshold value; and upon determining that at least one of the query matching metrics exceeds the predefined threshold value, designating the QA domain and sub-domain as relevant.

* * * * *